2,799,915

THERMAL MODIFICATION OF ACRYLONITRILE POLYMERS

Irvin Barnett and Stanley E. Zager, Somerville, N. J., assignors to Johns-Manville Corporation, New York, N. Y., a corporation of New York No Drawing. Application March 30, 1953, Serial No. 345,682

12 Claims. (Cl. 28—75)

This invention relates to the thermal modification of synthetic polymers which are in filamentary form, and more particularly relates to the thermal modification of filamentary materials composed of polyacrylonitrile and copolymers thereof. By "filamentary materials" is meant fibers, continuous filaments, yarns, threads, fabrics, or the like.

In Patent No. 2,404,714 there are disclosed filamentary materials which are composed of polyacrylonitrile or copolymers of acrylonitrile and various other monomers copolymerizable with acrylonitrile. Such materials have found wide textile usage due to their excellent characteristics of strength, electrical resistivity, substantial inertness to chemicals, flexibility, abrasion resistance, etc. In common with other thermoplastic organic fibrous materials, however, polyacrylonitrile filaments and the textile products formed therefrom possess the undesirable characteristics of fusion and eventual polymer breakdown under heat, and are combustible. Such polyacrylonitrile products have the additional undesirable characteristic of a relatively low heat distortion temperature and exhibit this characteristic in relatively high shrinkage at relatively low temperatures.

Efforts to overcome the adverse characteristics of acrylonitrile polymers when subjected to heat have been made. Surprisingly, it was found that a relatively long heat treatment of a fabric of continuous filament polyacrylonitrile could be employed to improve the thermal stability characteristics of such materials. For example, a sample of fabric composed of thermoplastic continuous filament polyacrylonitrile was heated for two hours at approximately 550° F. with hot air blown through the fabric. The obtained fabric, which had changed in color from pale yellow through brown to black, had a thermal stability completely unexpected in an organic material. This fabric was no longer thermoplastic, did not flame, and did not glow after a source of flame had been removed. Apparently some modification of the polymer took place, since the fabric passed slowly from a thermoplastic to a thermostable form, and in the latter was no longer soluble in known polyacrylonitrile solvents such as dimethylformamide or tetramethylene cyclic sulphone. While the heat treatment effects these changes, it caused no melting and fusing of the filaments; hence the yarns retained their filamentary structure, and the fabric retained the flexibility and pleasant hand of the corresponding untreated material. Although these unexpected results were obtained with heat treatment of polyacrylonitrile fabrics, the treatment apparently had an undesirable effect upon the molecular orientation of the polymer, and caused substantial shrinkage of the fabric and a corresponding increase in yarn denier.

The object of this invention is to provide a method of thermally modifying the properties of yarns, fabrics, and the like composed of at least 85% by weight of acrylonitrile without such an apparent adverse effect and hence without excessive shrinkage of the material treated.

It is a further object of this invention to provide a method of thermally modifying yarns and fabrics composed of spun staple acrylonitrile fibers.

It is an additional object of this invention to provide a method of thermally modifying continuous filament and spun staple fiber yarns composed of polyacrylonitrile, in which procedure linear shrinkage of the yarns is substantially minimized.

With the above objects and features in view, the invention consists in the method of thermally modifying filamentary materials composed of acrylonitrile polymers or copolymers hereinafter described and more particularly defined in the accompanying claims.

The preferred method of achieving the thermal modification of filamentary materials composed of a polymer containing acrylonitrile comprises heating the fabric, yarn or the like in air at a temperature ranging from approximately 300° F. to the depolymerization temperature of the particular polymer or copolymer employed, normally in the neighborhood of 650° F., for a period of time sufficient to result in a new filamentary material having improved thermal stability, that is, from approximately ½ hour to several days, with the time being varied inversely to the temperature. While the modification of the polymer can be obtained throughout the aforesaid range of conditions, it is obvious that relatively high temperatures as, for example, about 400–600° F. and the correspondingly shorter, more practical periods of time as, for example, about ½–36 hours will be preferred.

Such a treatment may be employed to result in the hereinbefore-described substantially heat-stable, non-flammable organic yarn, fabric or the like which substantially retains its excellent textile characteristics, but the treatment causes an undesirably high linear shrinkage of the material. For example, a continuous filament polyacrylonitrile fabric weighing about 3.5 oz. per sq. yd. and of a plain weave, when modified to a non-ignitible state by treatment in air at approximately 500° F. for 3 hours, exhibited approximately 39% net shrinkage in area. It can be seen that this problem of shrinkage is serious even when continuous filament yarns and fabrics are treated, and, as indicated hereinafter, the shrinkage effect of such a heat treatment substantially eliminates the possibility of thermally modifying yarns and fabrics formed from spun staple polyacrylonitrile fibers.

It has been found that the shrinkage of continuous filament yarns and fabrics may be slightly reduced by holding such yarns and fabrics under tension during the heat treatment. Preferably, tension in amount of at least approximately 0.5 gram/denier is employed. Obviously, the maximum tension which may be used is determined by the tensile strength of the thermally modified material obtained, which varies depending upon the type and weight of the material and extent of modification. While such tension somewhat reduces the shrinkage resulting from the heat treatment, the reduction is not considered sufficient for most purposes since the shrinkage still remains approximately 37% in a fabric of the type hereinbefore defined.

Tension cannot be successfully applied to polyacrylonitrile spun staple fiber yarns or fabrics to reduce the shrinkage in such materials in the same manner as when applied to continuous filament materials. The reason for this distinction is obvious when it is considered that in the case of continuous filament yarns the tensioning member controls the gripping of each individual filament; that is, the individual filament extends throughout the entire length of the yarn and is gripped on both ends with substantially constant tension applied throughout its span. In the case of yarns composed of spun staple fibers, however, this is not true. Obviously the individual fibers throughout the mass of the yarn are not gripped by the tensioning means and the tension applied to the individual fibers is resultant only from the friction between the individual fibers, made effective by the twist applied when spinning the yarn. It was found that it was not possible to retain yarns of fabrics composed of spun staple acrylonitrile fibers under tension during procedures for thermally modifying the material. The tension forces acting on the individual fibers were not sufficient to prevent any substantial amount of shrinkage, and, as a result, the fabric or yarn broke or pulled away from the tensioning device, and the yarns became "flaky"; that is the yarns exhibited varying diameters and weak, thin portions.

A method has been found whereby yarns and fabrics composed of spun staple polyacrylonitrile fibers may be successfully thermally modified without substantially destroying their structure, and the undesirable shrinkage of continuous filament polyacrylonitrile yarns and fabrics when thermally modified may be substantially minimized. In accordance with this invention, prior to exposure to the thermally modifying conditions, the polyacrylonitrile yarns and fabrics are treated with a dispersion of fine silica aggregates as, for example, an aqueous dispersion of colloidal silica, to deposit thereon substantial amounts of finely divided silica solids. The silica dispersion is employed in amount sufficient to deposit silica solids discontinuously upon the yarns, fabric or the like to substantially fill in the interstices between and around the filaments and also to form, in effect, a discontinuous silica network corresponding to the yarns or fabrics treated.

The amount of silica solids required in accordance with this invention essentially depends upon the continuous filament or spun staple fiber character of the yarns, and the design of the weave in the fabric treated. Slightly higher amounts are preferred in yarns and fabrics formed from spun staple fiber as compared to continuous filament yarns and fabrics. Similarly, a fabric with a plain weave and tight construction requires the least silica solids; whereas a weave such as a twill or a satin weave, with floats, and particularly such a weave having a relatively open construction, requires the greatest amounts of silica solids. Approximately 15–60% silica solids by weight of the fabric may be employed, and for most applications approximately 18–25% silica solids by weight of the fabric is preferred. For best results, tension in amount at least approximately 0.5 gram/denier is also employed during thermal modification of the materials treated with the silica solids, but such tension is not essential in all cases.

The silica solids deposited upon the yarns or fabrics substantially minimize the shrinkage of the fabric during the thermal modification procedure. For example, the plain weave fabric hereinbefore described which exhibited approximately 39% shrinkage when heat treated without tension and without silica treatment, and exhibited approximately 37% shrinkage when under tension, exhibited only 19% shrinkage when held under tension after treatment with approximately 20% by weight of silica solids. In each of these cases, the fabric samples were heat treated under the conditions heretofore indicated for this fabric. It is immediately apparent from this data that the silica treatment in accordance with this invention is of substantial advantage in minimizing the shrinkage resulting from the thermal modification of continuous filament yarns and fabrics. In addition to this important improvement in the resultant yarn or fabric, it is worthy of note that the silica treatment of this invention also appears to accelerate the thermal modification of the material, and resultant fabrics are substantially more flexible and have a more pleasant hand than those heat treated in the same manner but without the silica pretreatment.

The herein-defined silica treatment is considered essential in the heat treatment of yarns and fabrics formed from spun staple fiber composed of acrylonitrile polymers or copolymers. Without the silica treatment, it is not possible to maintain such yarns and fabrics under tension; hence, the resultant product is not of substantial utility due to the excessive shrinkage and distortion of the yarns. In addition to the shrinkage minimizing effect when employed in treating fabrics formed of continuous filament yarns, it is believed that the silica solids also serve to increase the friction between individual staple fibers to prevent slippage thereof, and thus prevent "flaking" of the yarns.

While the shrinkage characteristics of spun staple fiber and continuous filament yarns can be substantially alleviated by the silica treatment herein defined, it has been found that the apparent linear shrinkage of such materials can be further diminished by effecting a change in the structure of the untreated yarns. It has been found that the apparent linear shrinkage of spun stable fiber and continuous filament acrylonitrile polymer or copolymer yarns may be minimized by imparting to the yarns a substantial twist.

As is well known, the amount of twist desirable in any textile yarns is a function of the yarn size. With yarns of polymeric materials, the twist in turns per inch is conveniently determined by the quotient of a Twist Constant divided by the square root of the denier of the yarn employed. Under these circumstances, in order to eliminate the variable of yarn size or denier, it is desirable to express herein the twist to be employed in the yarns by recitation of the Twist Constant to be employed in calculating the desired turns per inch. When treating yarns to further minimize their apparent shrinkage in accordance with this invention, therefore, the twist in the yarn to be modified should be determined by employing a minimum Twist Constant of approximately 70 and a maximum Twist Constant of about 250. Some twist is ordinarily present in the original yarn, and the desired turns per inch, as determined by using the recited Twist Constant, should take this original twist into consideration. Lower values may be employed than the twist indicated by use of the minimum Twist Constant recited, but the lower number of turns per inch obtained would probably not result in sufficient advantage in reducing apparent linear shrinkage to warrant the additional twisting step. Higher twist than that recited may also be employed, but such higher twist tends to result in a brittle yarn after heat treatment.

After the thermal modification procedure has been completed with yarns or fabrics pretreated with silica in accordance with this invention, it has been found desirable to then treat the converted yarns or fabrics with a solvent which will remove the dried silica solids, for example, a dilute solution of hydrofluoric acid. Preferably, the converted material is treated with such an agent in amount approximately stoichiometrically equivalent to the silica deposited during pretreatment. Treatment with these materials, and particularly with hydrofluoric acid, improves the hand of the converted yarn or fabric, but, more important, substantially increases the flexural strength of the yarns. Comparative tensile strength tests were run on yarns taken from thermally modified fabrics which had been heat treated in the same manner, but which had been subjected to various pre- and after-treatments. Breaking tests were made on yarns from both creased and uncreased cloth in order to evaluate the flexural strength of the material. The creased sample was formed by placing a 200 gram weight on a fold for one minute; then the fold was reversed and the weight replaced for one minute.

Yarns taken from a heat treated fabric which had no silica treatment and no after-treatment exhibited a breaking strength of 0.85 gram per denier when uncreased and 0.09 gram per denier when creased. Yarns from the fabric treated with colloidal silica with no after-treatment exhibited a breaking strength of 1.35 grams per denier in the uncreased sample and 0.35 in the creased sample. Yarns from the fabric pretreated with colloidal silica and thereafter treated with dilute hydrofluoric acid exhibited a breaking strength of approximately 1.37 grams per denier in the uncreased sample, and, unexpectedly, exhibited a breaking strength of 1.23 grams per denier in the creased sample. From this data, it is immediately apparent that the hydrofluoric acid after-treatment of the material which had been pretreated with colloidal silica substantially improved the flexural strength of the thermally modified material.

The procedure of this invention is effective for minimizing shrinkage of yarns and fabrics containing acrylonitrile during thermal modification thereof in accordance with all heretofore-described procedures, including long exposure to relatively high temperatures in air, vacuum, or nitrogen atmosphere, as well as treatment in a molten salt bath or high boiling liquid. The treatment is effective when thermally modifying any polymer containing acrylonitrile which is known to be susceptible to such thermal modification, and particularly effective in modifying a polymer or copolymer that contains at least 85% acrylonitrile units in the polymer molecule, with the remaining 15% a monomer copolymerizable with acrylonitrile, as, for example, styrene, butadiene, methyl vinyl ketone, methacrylic acid, vinyl pyridines, vinyl chloride, vinyl acetate, vinylidine, vinylidene cyanide, etc., or a pluarlity of such monomers.

It is to be understood that the procedures disclosed herein are not limited to the formation of completely modified filamentary materials composed of acrylonitrile polymers or copolymers. On the other hand, it has been found that products of substantial utility may be obtained by effecting the procedure to result in only partial modification of such materials. As heretofore indicated, full modification of such materials results in a filamentary material which is non-ignitible, will not glow, and which has excellent resistance to thermal distortion. While partial modification does not result in a filamentary material which is completely non-ignitible and non-glowing, it results in a substantially non-thermoplastic product which is substantially resistant to flame and glow, and which exhibits the characteristics of substantial heat stability and a relatively high heat distortion temperature and thus relatively low shrinkage at elevated temperatures, to substantially the same degree as the completely modified materials. Such products, in addition to exhibiting the aforementioned characteristics, substantially retain the excellent abrasion resistance and strength of the unmodified filamentary materials.

The degree of thermal modification of such materials may be conveniently expressed on the basis of percent by weight of filamentary material remaining after exposure to an igniting flame and removal of all volatile and flammable constituents. Obviously, in order to obtain the desired useful materials, the thermal modification must be sufficient that the material remaining after such a test procedure retains the filamentary character of the original material. The preferred partially modified filamentary materials composed of acrylonitrile polymers or copolymers are those which indicate at least approximately 60% by weight of residual non-ignitible filamentary material when tested as heretofore defined. This content of non-ignitible filamentary material is necessary in order that the partly modified material have sufficient heat stability to retain its filamentary form and the strength necessary for service use at elevated temperatures. Often it is preferred that the materials be only converted to no more than 95% by weight of non-ignitible material to insure adequate abrasion resistance and tensile and flexural strength for their intended uses. Fabrics which have been subjected to such partial thermal modification have particular utility as dust collection bags in mechanically vibrating units employed in high temperature service, and in other services where a fabric which is substantially flame-resistant, dimensionally stable under heat, and high in tensile and flexural strength and abrasion resistance is desirable or necessary.

It will be understood that the details given herein are for the purpose of illustration, not restriction, and that variations within the spirit of the invention are intended to be included in the scope of the appended claims.

What we claim is:

1. In the process of thermally modifying a filamentary material composed of a polymer containing a major proportion of acrylonitrile which comprises heating said filamentary material at a temperature from approximately 300° F. to but not including the depolymerization temperature of the polymer, for a period of time sufficient to result in a substantially non-thermoplastic new filamentary material which has improved thermal stability and contains at least 60% by weight of non-ignitible mass, the improvement which comprises coating said filamentary material with an aqueous dispersion of fine silica aggregates in amount sufficient to deposit thereon a discontinuous film of silica solids prior to said heat treatment so as to minimize the shrinkage of said material during the thermal modification thereof.

2. In the process of thermally modifying a filamentary material composed of a polymer containing a major proportion of acrylonitrile which comprises heating said filamentary material at a temperature from approximately 300° F. to but not including the depolymerization temperature of the polymer, for a period of time sufficient to result in a substantially non-thermoplastic new filamentary material which has improved thermal stability and contains at least 60% by weight of non-ignitible mass, the improvement which comprises coating said filamentary material with an aqueous dispersion of fine silica aggregates in amount sufficient to deposit thereon approximately 15-60% silica solids by weight of material treated prior to said heat treatment so as to minimize the shrinkage of said material during the thermal modification thereof.

3. The process of thermally modifying a filamentary material composed of spun staple fibers of a polymer containing a major proportion of acrylonitrile, which comprises coating said material with an aqueous dispersion of fine silica aggregates in amount sufficient to deposit thereon a discontinuous film of silica solids and then heating said material at a temperature from approximately 300° F. to but not including the depolymerization temperature of the polymer, for a period of time sufficient to result in a substantially non-thermoplastic new filamentary material which has improved thermal stability and contains at least 60% by weight of non-ignitible mass.

4. The process of thermally modifying a filamentary material composed of spun staple fibers of a polymer containing a major proportion of acrylonitrile, which comprises coating said material with an aqueous dispersion of fine silica aggregates in amount sufficient to deposit thereon a discontinuous film of silica solids and then heating said material at a temperature from approximately 300° F. to but not including the depolymerization temperature of the polymer, for a period of time sufficient to result in a substantially non-thermoplastic new filamentary material which has improved thermal stability and contains at least 60% by weight of non-ignitible mass while maintaining said material under tension.

5. The process of thermally modifying a filamentary material composed of a polymer containing a major proportion of acrylonitrile, which comprises coating said material with an aqueous dispersion of fine silica aggregates in amount sufficient to deposit thereon approximately 15-60% silica solids by weight of material treated, heating said material at a temperature from approximately 300° F. to but not including the depolymerization temperature of the polymer for a period of time sufficient to result in a substantially non-thermoplastic new filamentary material which has improved thermal stability and contains at least 60% by weight of non-ignitible mass, while maintaining said material under tension, and then removing dried silica solids by treating said material with an aqueous solution of hydrofluoric acid in amount approximately stoichiometrically equivalent to the silica initially deposited thereon.

6. The process of thermally modifying a filamentary material composed of spun stable fibers of a polymer containing a major proportion of acrylonitrile, which comprises coating said material with an aqueous dispersion of fine silica aggregates in amount sufficient to deposit thereon a discontinuous film of silica solids, heating said material at a temperature from approximately 300° F. to but not including the depolymerization temperature of the polymer for a period of time sufficient to result in a substantially non-thermoplastic new filamentary material which has improved thermal stability and contains at least 60% by weight of non-ignitible mass, and then removing dried silica solids by treating said material with an aqueous solution of hydrofluoric acid.

7. The process of thermally modifying a filamentary material composed of spun staple fibers of a polymer containing a major proportion of acrylonitrile, which comprises coating said material with an aqueous dispersion of fine silica aggregates in amount sufficient to deposit thereon a discontinuous film of silica solids, heating said material at a temperature from approximately 300° F. to but not including the depolymerization temperature of the polymer for a period of time sufficient to result in a substantially non-thermoplastic new filamentary material which has improved thermal stability and contains at least 60% by weight of non-ignitible mass while maintaining said material under tension, and then removing dried silica solids by treating said material with an aqueous solution of hydrofluoric acid.

8. The process of thermally modifying a filamentary material composed of a polymer containing a major proportion of acrylonitrile while minimizing the shrinking thereof which comprises coating said material with an aqueous dispersion of fine silica aggregates in amount sufficient to deposit thereon a discontinuous film of silica solids, heating said material at a temperature from approximately 300° F. to but not including the depolymerization temperature of the polymer for a period of time sufficient to result in a substantially non-thermoplastic new filamentary material which has improved thermal stability and contains at least 60% by weight of non-ignitible mass, and then treating said material with an agent capable of removing the dried silica solids.

9. The process of thermally modifying a filamentary material composed of a polymer containing a major proportion of acrylonitrile while minimizing the shrinkage thereof which comprises coating said material with an aqueous dispersion of fine silica aggregates in amount sufficient to deposit thereon a discontinuous film of silica solids, heating said material at a temperature from approximately 300° F. to but not including the depolymerization temperature of the polymer for a period of time sufficient to result in a substantially non-thermoplastic new filamentary material which has improved thermal stability and contains at least 60% by weight of non-ignitible mass, and then removing dried silica solids by treating said material with an aqueous solution of hydrofluoric acid.

10. The process of thermally modifying a filamentary material composed of a polymer containing a major proportion of acrylonitrile while minimizing the shrinkage thereof which comprises coating said material with an aqueous dispersion of fine silica aggregates in amount sufficient to deposit thereon approximately 15 to 60% silica solids by weight of the material treated, heating said material at a temperature from approximately 300° F. to but not including the depolymerization temperature of the polymer for a period of time sufficient to result in a substantially non-thermoplastic new filamentary material which has improved thermal stability and contains at least 60% by weight of non-ignitible mass, and then removing dried silica solids by treating said material with an aqueous solution of hydrofluoric acid.

11. The method of thermally modifying yarns composed of a polymer containing a major proportion of acrylonitrile while minimizing the shrinkage thereof which comprises providing in said yarns a twist determined by employing a Twist Constant of approximately 70 to 250, coating said yarns with an aqueous dispersion of fine silica aggregates in amount sufficient to deposit thereon a discontinuous film of silica solids, heating said yarns to a temperature from approximately 300° F. to but not including the depolymerization temperature of the polymer for a period of time sufficient to result in a substantially non-thermoplastic new filamentary material which has improved thermal stability and contains at least 60% by weight of non-ignitible mass.

12. The process of thermally modifying a filamentary material composed of a polymer containing a major proportion of acrylonitrile while minimizing the shrinkage thereof which comprises coating said material with an aqueous dispersion of fine silica aggregates in amount sufficient to deposit thereon a discontinuous film of silica solids, heating said material at a temperature from approximately 300° F. to but not including the polymerization temperature of the polymer for a period of time sufficient to result in a substantially non-thermoplastic new filamentary material which has improved thermal stability and contains at leats 60% by weight of non-ignitible mass, and then removing dried silica solids by treating said material with an aqueous solution of hydrofluoric acid.

References Cited in the file of this patent

UNITED STATES PATENTS

| | | |
|---|---|---|
| 2,346,208 | Conaway | Apr. 11, 1944 |
| 2,394,540 | Finzel | Feb. 12, 1946 |
| 2,395,396 | Conaway | Feb. 26, 1946 |
| 2,420,565 | Rugeley et al. | May 13, 1947 |